No. 808,077. PATENTED DEC. 26, 1905.
W. G. FELKNER & J. T. BUTLER.
CATTLE GUARD AND GATE.
APPLICATION FILED MAY 25, 1905.
2 SHEETS—SHEET 1.
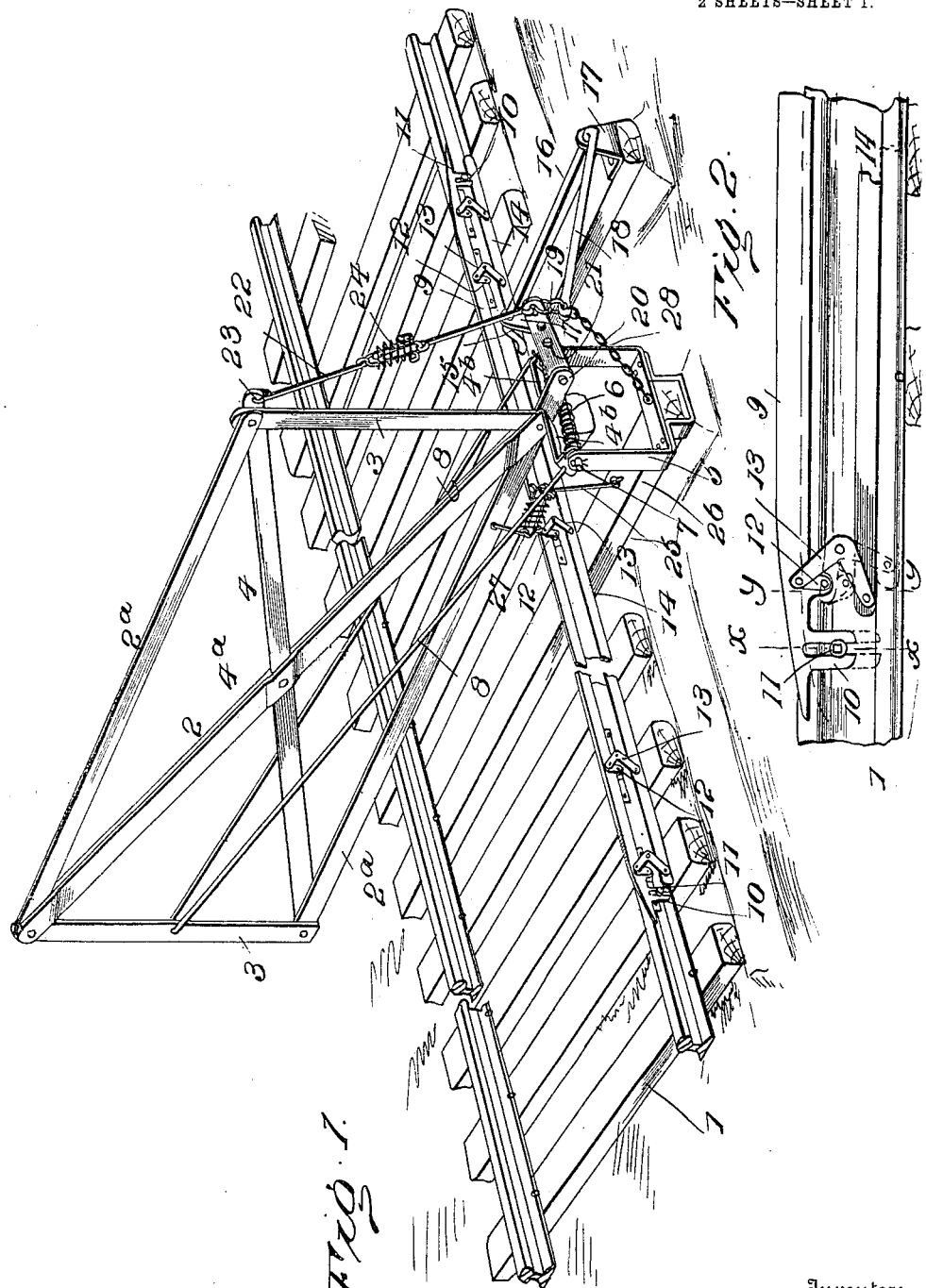
Inventors
W. G. Felkner
J. T. Butler
Witnesses
By  Attorneys No. 808,077. PATENTED DEC. 26, 1905.
W. G. FELKNER & J. T. BUTLER.
CATTLE GUARD AND GATE.
APPLICATION FILED MAY 25, 1905.
2 SHEETS—SHEET 2.
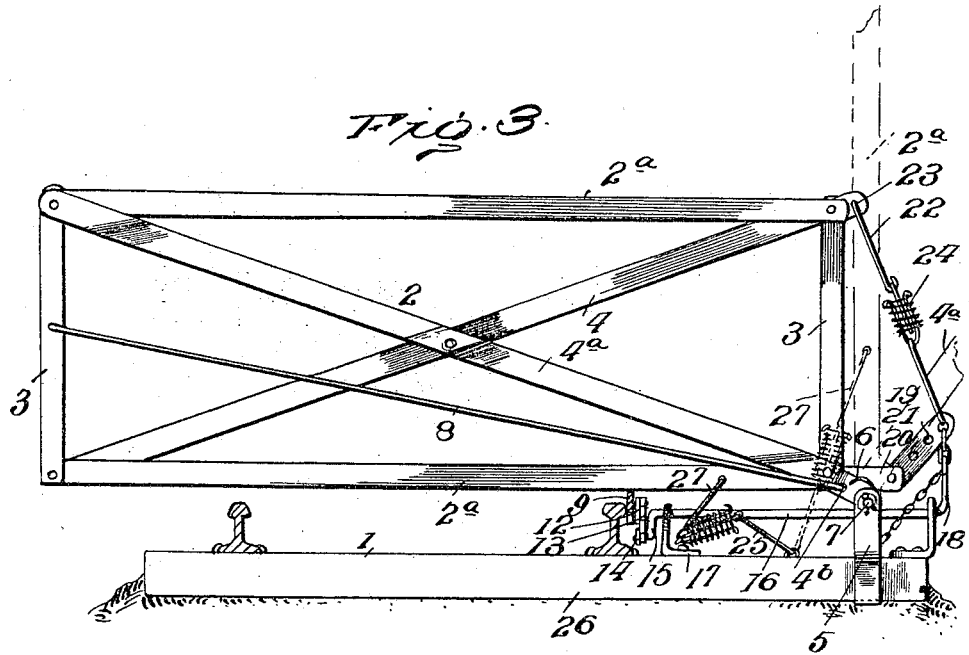
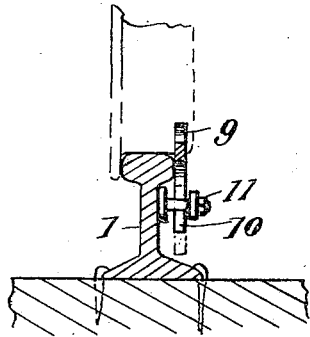
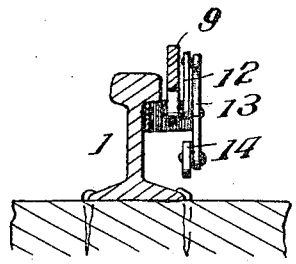

UNITED STATES PATENT OFFICE.

WILLIAM G. FELKNER AND JAMES T. BUTLER, OF SEBREE, TEXAS.

CATTLE GUARD AND GATE.

No. 808,077. Specification of Letters Patent. Patented Dec. 26, 1905.

Application filed May 25, 1905. Serial No. 262,292.

*To all whom it may concern:*

Be it known that we, WILLIAM G. FELKNER and JAMES T. BUTLER, citizens of the United States, residing at Sebree, in the county of Jack and State of Texas, have invented certain new and useful Improvements in Cattle Guards and Gates, of which the following is a specification.

This invention involves improvements in that type of cattle-guards utilizing a gate normally disposed across a railroad-track and operating mechanism for the gate adapted for actuation by a moving train approaching the guard from either direction.

The essential features of the invention reside in the special operating means by which the gate is thrown across and away from the track, said operating means being constructed with a view to simplicity, to securing ease of actuation of the parts, and to reduce the wear upon the parts to a minimum, thereby securing effective mechanism for accomplishing the desired purposes.

For a full description of the invention and the merits thereof and also to acquire a knowledge of the details of construction of the means for effecting the results reference is to be had to the following description and accompanying drawings, in which—

Figure 1 is a perspective view showing a railroad-track and a cattle-guard disposed in operative position across the same. Fig. 2 is a broken view in elevation, showing an end portion of the pressure-rail located at one side of a main rail of the track for actuating the gate. Fig. 3 is a transverse sectional view taken across the track, showing the operating mechanism partially in section and the gate in elevation. Fig. 4 is a vertical section taken about on the line X X of Fig. 2, a car-wheel being shown in dotted lines, as when passing on the pressure-rail, the pressure-rail being shown down in dotted lines. Fig. 5 is a vertical section on the line Y Y of Fig. 2.

Corresponding and like parts are referred to in the following description and indicated in all the views of the drawings by the same reference characters.

Specifically describing the various detail features of the invention and referring to the drawings, the numeral 1 indicates the track, in the length of which is disposed a cattle-guard constructed in accordance with the essential features of this invention. The cattle-guard embodies a gate 2, and this gate is preferably constructed in any substantial manner, being composed of the upper and lower horizontal rails $2^a$, the end batons 3, and the diagonal braces 4 and $4^a$. The brace $4^a$ is composed of spaced bars, the lower ends of which are extended laterally, as shown at $4^b$, and pivotally connected with a support 5 at one side of the track. It will be seen that the gate 2 is thus pivotally mounted upon the support 5 and is adapted to be moved or tilted vertically in order that it may be disposed across or pulled to one side of the track. If desirable, a coil-spring 6 may be carried by the pivot 7, which connects the gate with the support 5, and the ends of this spring 6 may be so engaged with the end $4^b$ of the brace-bars $4^a$ that the spring 6 will normally coact to hold the gate 2 across the track. Suitable rods 8 are connected with the outer or front baton 3 of the gate at one end, the opposite ends of said rods being connected with the end portions $4^b$ of the brace $4^a$.

In accordance with this invention it is designed to use a pressure-rail 9, to be operated by the rolling-stock as it approaches the gate, so that when the rail is moved out of its normal position its operative connections with the gate will throw the latter open or away from the track by vertical tilting movement. The pressure-rail 9 is of a peculiar construction and has peculiar connections with the gate, which form an important feature of this invention. Said rail 9 extends a suitable distance upon opposite sides of the gate, so that it may be actuated by a train approaching from either direction and is provided at its ends with downwardly-projecting guide members 10, having vertical slots which receive pins 11, projecting from the adjacent side of the rail. The pins 11 coöperate with the guide members 10, which may be provided in any suitable number in the length of the rail 9, so that said rail moves vertically when it is actuated as the train passes thereover. The pressure-rail is connected by links 12 with the upper ends of bell-crank levers 13, said levers 13 supporting the pressure-rail and having their lower ends or arms connected by a rod or bar 14. The vertical movement of the pressure-rail 9 therefore pulls downwardly upon the bell-crank levers 13 and the latter will impart longitudinal movement to the bar 14. The bar 14 is connected with a crank 15 of a double-crank shaft 16, which extends at about a right angle to the track 1 at one side thereof, said shaft 16 being carried in suitable bearing-brackets 17. The crank 15 is at one end of the crank-shaft 16 and at the opposite end is a second and longer crank 18, the latter being connected by a link 19 with an extended end portion 20 of the lower longitudinal rail $2^a$ of the gate 2. The crank-arm 18 may have adjustable connection with the link 19, the latter having a plurality of openings 21 to admit thereof. A connection 22 also connects the link 19 with the upper portion of the gate 2, as shown at 23, and a spring or similar cushion device 24 is located in the length of the connection 22, making the same elastic. The crank-arm 18 is therefore connected with the gate 2 at its lower portion, as well as at its upper portion, and downward movement of the crank-arm will pull downwardly upon the link 19 and connection 22, tilting the gate upwardly in an obvious manner, the spring 24 relieving the gate of shock upon the quick downward movement of the crank-arm 18. The upward tilting movement of the gate is of course against the tension of the spring 6, coöperating therewith to hold it normally across the track, and in addition to the spring 6 it is designed that the lower rail $2^a$ of the gate shall be connected by a flexible and elastic connection 25, with a tie or similar part 26 adjacent the support 5, and this flexible and elastic connection 25, made flexible by the spring 27, will form a means for limiting the upward outward opening movement of the gate, preventing the latter from reaching the limit of its opening movement and stopping with a shock, relieving the parts of wear and tear in an obvious manner.

It will be seen that as the train approaches the gate 2 when it is in its normal position as soon as the wheels of the cars strike the pressure-rail 9 said rail will be forced downwardly, actuating the crank-levers 13 and imparting longitudinal movement to the bar 14, which actuates the shaft 16. The arm 18 is carried downwardly in its movement and the gate is pulled or tilted upwardly so as to open as the train passes. As soon as the train has left the rail 9 the tension of the spring 6, and to a certain extent that of the spring 27 in the length of the connection 25, will restore the gate to its normal position across the track, the downward or closing movement of the gate being limited by a chain or similar connection 28, connected at one end with the support 5 and at its opposite end with the crank-arm 18, the connection 24 coacting to form an elastic means for limiting the closing movement of the gate also.

Having thus described the invention, what is claimed as new is—

1. In combination, a gate, a pressure-rail, a link connected with one part of the gate, an elastic connection connected with another part of the gate, a crank-shaft connected with the pressure-rail, and a crank-arm projected from said shaft and connected with the link and the elastic connection aforesaid for actuation of the gate.

2. In combination, a gate, a pressure member, to be actuated by the rolling-stock, a link connected with one part of the gate, an elastic connection connected with another part of the gate, a crank-shaft connected with the pressure member aforesaid, a crank-arm projected from said crank-shaft and connected with the link and the elastic connection for the actuation of the gate, a flexible connection for limiting the opening movement of the gate, and means connected with the crank-arm for limiting the closing movement of the gate.

3. In combination, a gate, operating means for the gate, a link connected with one part of the gate, an elastic connection connected with another part of the gate, the link and elastic connection being both connected with the operating means aforesaid, means connected with the link for limiting the closing movement of the gate, and a second elastic connection connected with the gate and coacting to limit its opening movement.

In testimony whereof we affix our signatures in presence of two witnesses.

WILLIAM G. FELKNER. [L. S.]
JAMES T. BUTLER. [L. S.]

Witnesses:
LOUIS M. RAGSDALE,
WILLIAM G. POUNDS.